Figure 1:
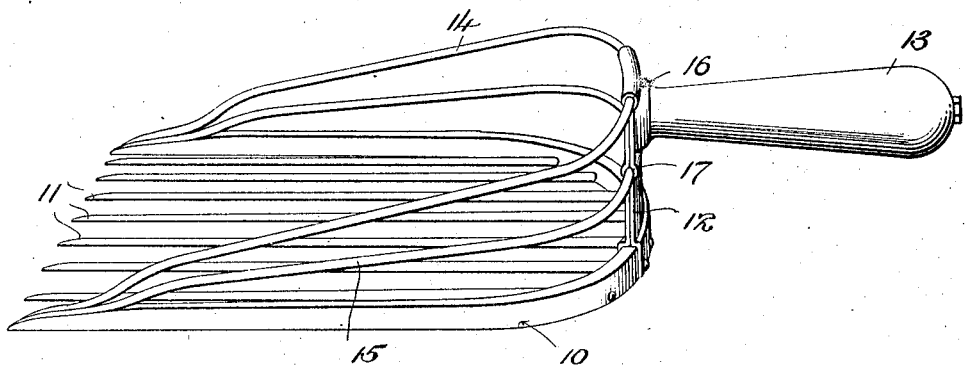

March 17, 1925.

E. I. WHITEHEAD

POTATO SCOOP

Filed Aug. 22, 1924

1,530,148

Inventor
E. I. Whitehead,
by Bright & Bailey
Attorneys

Patented Mar. 17, 1925.

1,530,148

UNITED STATES PATENT OFFICE.

EUGENE I. WHITEHEAD, OF CANTON, SOUTH DAKOTA.

POTATO SCOOP.

Application filed August 22, 1924. Serial No. 733,639.

*To all whom it may concern:*

Be it known that I, EUGENE I. WHITEHEAD, a citizen of the United States, and resident of Canton, in the county of Lincoln and State of South Dakota, have invented certain new and useful Improvements in Potato Scoops, of which the following is a specification.

My invention relates to potato scoops and particularly to scoops of this type for gathering relatively small quantities of potatoes from a bin in the retail trade.

It is the purpose of my present invention to provide a scoop of the type specified whose bottom is flat throughout its entire extent so as to enable an operator, without exercising undue care, to move the scoop into a supply of potatoes with its entire bottom bearing uniformly upon the floor of the bin and thus avoid cutting and otherwise injuring the potatoes; this in contradistinction from those scoops of this type having their bottoms rounded at the rear or having heads extending below the tines, such as are shown in U. S. Patents 566,868; 291,395 and 411,879; and in the use of which extraordinary care must be exercised in order not to force the scoop into the potato supply with the advance ends of the tines elevated with resulting cutting or injury to the potatoes.

It is also the purpose of my invention to so construct the scoop that the tines will be secured at their inner ends only thus rendering them individually flexible and readily capable of adjusting themselves to inequalities in the floor of the bin over which the scoop is being moved.

I will describe my invention in the best form known to me at present, but it will be apparent that the same is susceptible to changes in forms and proportions and to desirable additions with the exercise of only ordinary mechanical skill and without departing from the scope of the invention as set forth in the appended claims.

In the drawings chosen to illustrate my invention

Figure 2:
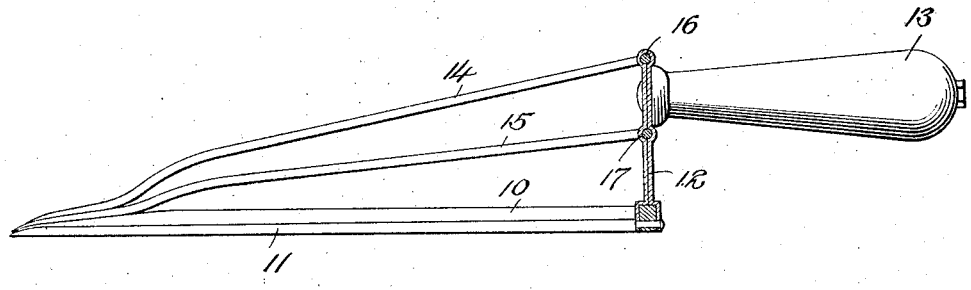

Figure 1 is a perspective view of a potato scoop constructed in accordance with my invention; and Figure 2, a longitudinal sectional view of the same.

Referring to the drawings my invention is shown as comprising a U-shape frame member 10 defining the bottom of the scoop and having its bottom edge disposed throughout in a given plane. Confined within the member 10 is a series of tines 11 secured at their inner ends to the frame member 10 and being free throughout the remainder of their length both with respect to the member 10 and with respect to each other whereby they may flex individually to adjust themselves to inequalities of a bin floor over which the scoop is being moved. Furthermore, the tines 11 are connected to the member 10 in such position as to dispose the lowermost surfaces thereof normally in the plane of the lower edge of the frame member 10, thus rendering the bottom of the scoop flat throughout its entire extent.

Rising centrally from the U-shaped member 10 is a head 12 from which projects rearwardly a handle 13. A side and rear guard for the scoop is provided by U-shaped elements 14 and 15 which are suitably secured at their arm connecting portions to the head 12 and at their free ends to the frame member 10 as clearly shown in the drawing. In the present embodiment of my invention I connect the members 14 and 15 with the head 12 by engaging said members respectively through passages 16 and 17 formed in said head.

I claim:

1. A potato scoop having its entire bottom portion flat and formed of a U-shaped frame member, a series of tines confined within and secured to the member with their lowermost surfaces normally included in the plane of the lower edge of said frame member, a handle for the scoop, and a side and rear guard arranged above said frame member.

2. A potato scoop having its entire bottom portion flat and formed of a U-shaped frame member, a series of tines confined within and secured at their inner ends to the member with their lowermost surfaces normally included in the plane of the lower edge of said frame member, said tines being free throughout the remainder of their length both with respect to the frame member and with respect to each other whereby they may flex individually to conform to inequalities in the floor of a bin over which the scoop is being moved, a handle for the scoop, and a side and rear guard arranged above said frame member.

3. A potato scoop having its entire bottom portion flat and formed of a U-shaped frame member, a series of tines confined within and having their inner ends secured to said frame member with their lowermost surfaces included in the plane of the lower edge of said frame member, a head rising from the arm connecting portion of the frame member, a handle secured to said head, and a side and rear guard for the scoop, said guard comprising a series of U-shaped elements secured intermediately to said head and at their ends to the U-shaped frame member.

In testimony whereof I hereunto affix my signature.

EUGENE I. WHITEHEAD.